United States Patent
Huang et al.

(10) Patent No.: US 9,431,169 B2
(45) Date of Patent: Aug. 30, 2016

(54) PRIMARY POWER SUPPLY TUNING NETWORK FOR TWO COIL DEVICE AND METHOD OF OPERATION

(71) Applicant: QUALCOMM Incorporated, San Diego, CA (US)

(72) Inventors: Chang-Yu Huang, Auckland (NZ); Nicholas A. Keeling, Auckland (NZ); Mickel Budhia, Auckland (NZ); Michael Kissin, Auckland (NZ); Jonathan Beaver, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 538 days.

(21) Appl. No.: 13/913,052

(22) Filed: Jun. 7, 2013

(65) Prior Publication Data
US 2014/0361628 A1   Dec. 11, 2014

(51) Int. Cl.
| H01F 27/42 | (2006.01) |
| H01F 37/00 | (2006.01) |
| H01F 38/00 | (2006.01) |
| H01F 38/14 | (2006.01) |
| H02J 17/00 | (2006.01) |

(52) U.S. Cl.
CPC .............. *H01F 38/14* (2013.01); *H02J 17/00* (2013.01)

(58) Field of Classification Search
CPC .......... H02J 5/005; H02J 17/00; H02J 7/025; H02J 3/383; H02J 7/0042; H02J 7/0044; H02J 13/0082; H02J 1/00; H02J 1/102; H02J 2001/106; H02J 2009/007; H02J 3/01; H02J 7/0004; H02J 7/0008; H02J 7/00
USPC ....................................................... 307/104
See application file for complete search history.

(56) References Cited

U.S. PATENT DOCUMENTS

| 6,150,600 | A | 11/2000 | Buchla | |
| 8,912,687 | B2* | 12/2014 | Kesler | B60L 11/182 307/10.1 |
| 8,923,015 | B2* | 12/2014 | Madawala | H02J 5/005 307/104 |
| 2005/0135122 | A1* | 6/2005 | Cheng | H02J 5/005 363/24 |
| 2007/0298846 | A1 | 12/2007 | Greene et al. | |
| 2010/0259217 | A1 | 10/2010 | Baarman et al. | |
| 2011/0074218 | A1* | 3/2011 | Karalis | B60L 11/182 307/104 |
| 2011/0304216 | A1* | 12/2011 | Baarman | H02J 17/00 307/104 |
| 2012/0153739 | A1 | 6/2012 | Cooper et al. | |

(Continued)

FOREIGN PATENT DOCUMENTS

| EP | 2573950 A2 | 3/2013 |
| WO | WO-2009027674 A1 | 3/2009 |
| WO | 2010136928 A1 | 12/2010 |

OTHER PUBLICATIONS

International Search Report and Written Opinion—PCT/US2014/039522—ISA/EPO—Oct. 1, 2014.

*Primary Examiner* — Jared Fureman
*Assistant Examiner* — Esayas Yeshaw
(74) *Attorney, Agent, or Firm* — Knobbe, Martens, Olson & Bear LLP

(57) ABSTRACT

This disclosure provides systems, methods and apparatus for connecting and operating an AC source to a load. In one aspect a power supply topology is provided which may be of particular use in the area of wireless power transfer. The topology allows for a single source to energize one or more conductive structures configured to generate a field, improving power transfer to a power receiver.

24 Claims, 16 Drawing Sheets

(56) References Cited

U.S. PATENT DOCUMENTS

| | | |
|---|---|---|
| 2012/0169139 A1 | 7/2012 | Kudo |
| 2013/0057082 A1* | 3/2013 | Takada .................. B60L 11/182 307/104 |
| 2013/0141037 A1 | 6/2013 | Jenwatanavet et al. |
| 2013/0175874 A1* | 7/2013 | Lou ...................... H04B 5/0093 307/104 |
| 2015/0054350 A1* | 2/2015 | Covic .................... H01F 38/14 307/104 |
| 2015/0084588 A1* | 3/2015 | Covic ................... B60L 11/182 320/108 |

* cited by examiner

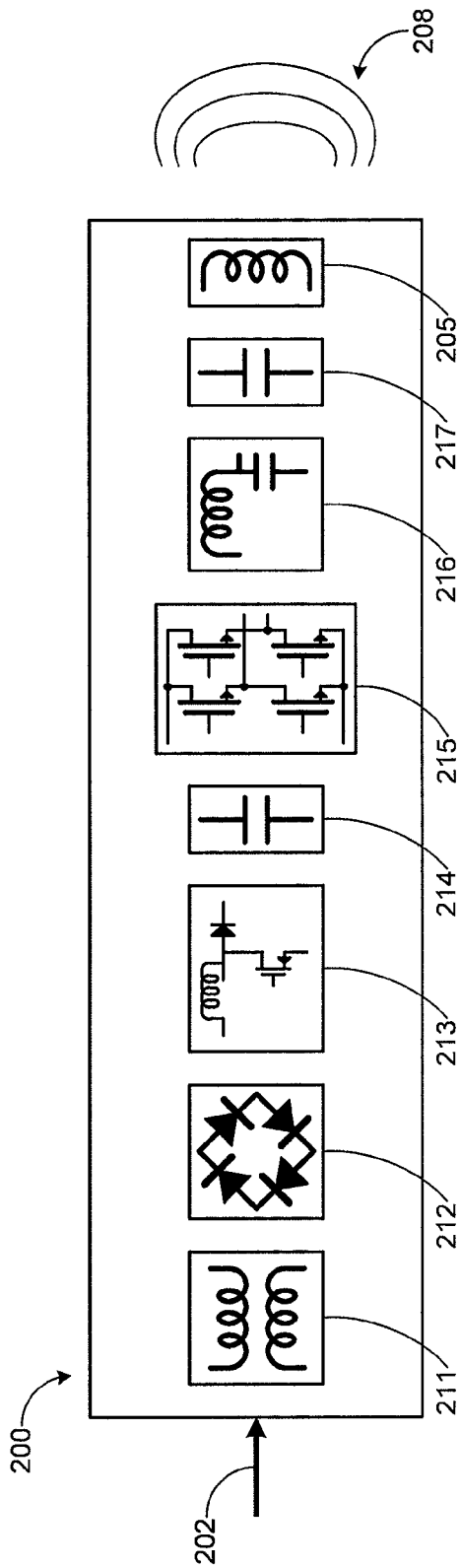
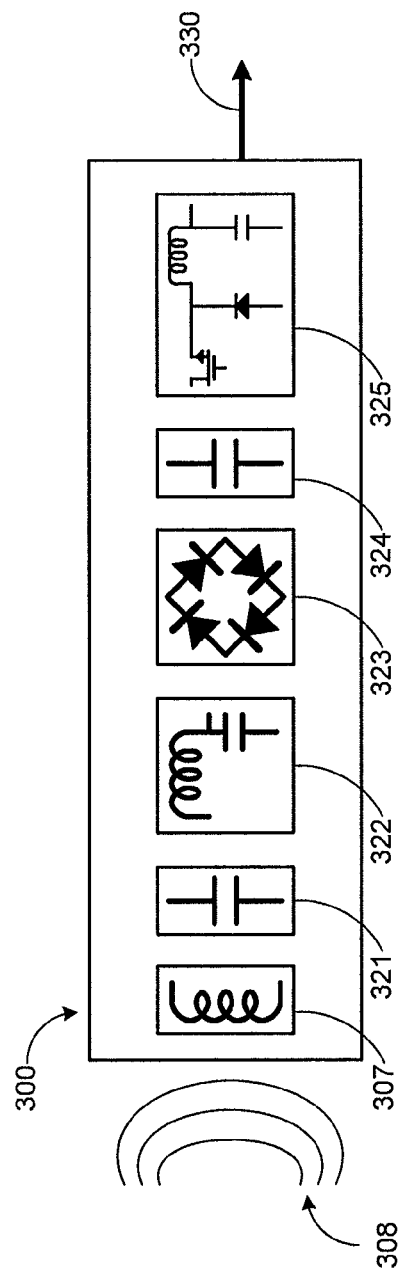
FIG. 2
FIG. 3

PRIMARY POWER SUPPLY TUNING NETWORK FOR TWO COIL DEVICE AND METHOD OF OPERATION

FIELD

The present disclosure relates generally to wireless power transfer, and more specifically to devices, systems, and methods related to wireless power transfer to remote systems such as vehicles including batteries. More specifically, the present disclosure relates to a power supply topology that allows a single drive signal from a power source to energize one or more conductive structures.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, there is a need for systems and methods that efficiently and safely transfer wireless power.

SUMMARY

In wireless power transfer systems, the relative positioning of the primary transmit coil and secondary receive coil can greatly impact both the efficiency of power transfer and the amount of power delivered from the transmitter to the receiver. One solution to the variable positioning problem involves generating a magnetic field by powering more than one transmit coil with the transmitter. This may cover a greater physical area and allows the transmit coils to be positioned and powered to "shape" the generated magnetic field and vary the field strength to increase the magnetic flux seen by the receive coil. In order to fully control a multiple coil transmitter, the ability to adjust the magnitude of the current driven through the coils as well as the relative phase of the current between coils dictates the use of separate power sources (e.g., inverter bridges) and tuning networks. However, multiple sources and tuning networks increase the physical size and monetary cost of the transmitter due to the number and quantity of components. Each source, tuning network, and other circuitry must be rated for the full power of the transmitter. Further, multiple sources increases the control complexity of the transmitter. As such, the present disclosure relates to a tuning network that may selectively route a single drive signal from a source to the primary coils. The tuning network may be reconfigured to selectively energize or disable the primary coils during operation of the transmitter.

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless power transmitter. The transmitter comprises a first conductive structure configured to generate a first field. The transmitter further comprises a second conductive structure in series with the first conductive structure and configured to generate a second field. The transmitter further comprises a source configured to generate a drive signal. The transmitter further comprises a circuit configured to selectively route the drive signal to either one of the first or the second conductive structures or to both of the first and the second conductive structures, and further configured to maintain a tuning of the one or both of the first and second conductive structures driven by the drive signal.

Another aspect of the disclosure provides a method of wirelessly transmitting power. The method comprises generating a drive signal with a source. The method further comprises routing the drive signal dynamically during power transfer to either: energize a first conductive structure to generate a first field; energize a second conductive structure to generate a second field; or energize the first and the second conductive structures in series to generate a third field.

Another aspect of the disclosure provides a wireless power transmitter. The transmitter comprises means for generating a drive signal. The transmitter further comprises means for routing the drive signal dynamically during power transfer to either: energize a first means for generating a first field; energize a second means for generating a second field; or energize both of the first and the second means for generating to generate a third field.

BRIEF DESCRIPTION OF THE DRAWINGS

FIG. 2 is a functional block diagram of an exemplary wireless power transmitter that may be used in the wireless power transfer system of FIG. 1.

FIG. 3 is a functional block diagram of an exemplary wireless power receiver that may be used in the wireless power transfer system of FIG. 1.

Figure 1:
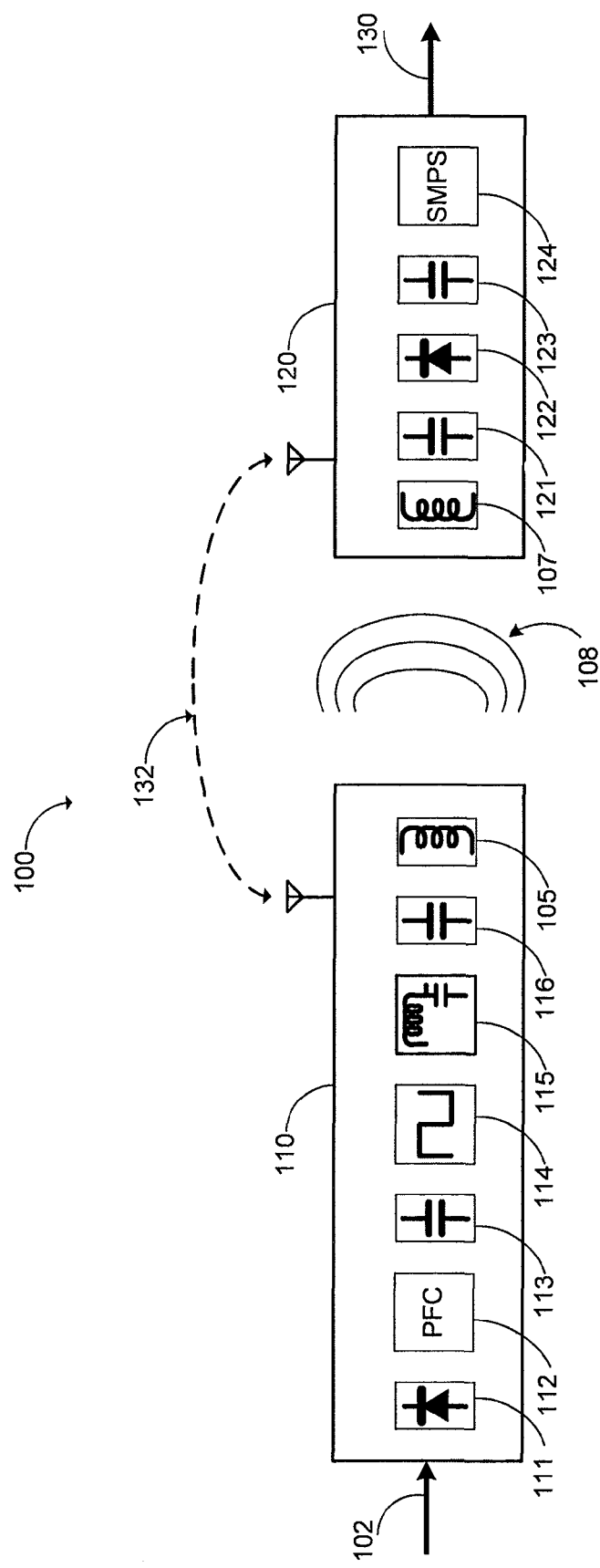
FIG. 1 is a functional block diagram of an exemplary wireless power transfer system.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

FIG. 1 is a functional block diagram of an exemplary wireless power transfer system 100. Input power 102 is provided to a wireless power transmitter 110, which converts the input power 102 to a form appropriate to drive a transmit circuit which generates a field 108 for providing energy transfer. Transmit circuit may include a conductive structure 105 and capacitor 116. The conductive structure 105 may be configured to generate a time varying magnetic field 108 in response to an excitation by an alternating current. A receive circuit may include a conductive structure 107 and capacitor 121. The conductive structure 107 couples to the conductive structure 105 via energy of the magnetic field 108 to induce a voltage, which is rectified and filtered by a wireless power receiver 120. The term "conductive structure" as used herein may be a loop, coil, antenna, or other structure. A conductive structure associated with a transmitter generates a magnetic field for wirelessly conveying energy to a conductive structure associated with a receiver. Conversely, a conductive structure associated with a receiver receives energy from a magnetic field generated by a conductive structure associated with a conductive structure associated with a wireless power transmitter. The resulting output may be used for storing or consumption by a device (not shown) coupled to the output power 130. Both the conductive structure 105 and the conductive structure 107 are separated by a distance. The conductive structure 105 and conductive structure 107 are tuned to resonate at an operating frequency of the system to optimize the efficiency of power transfer. When the resonant frequency of conductive structure 107 and the resonant frequency of conductive structure 105 are very close, transmission losses between the conductive structure 105 and the conductive structure 107 are minimal when the conductive structure 107 is located in the region where the majority of the flux lines of the magnetic field 108 pass near or through the conductive structure 107.

The conductive structure 105 and conductive structure 107 may be sized according to applications and devices to be associated therewith. Efficient energy transfer occurs by coupling a large portion of the energy of the field of the conductive structure 105 to a conductive structure 107 rather than propagating most of the energy in an electromagnetic wave to the far field. When in this near field, a coupling mode may be developed between the conductive structure 105 and the conductive structure 107. The area around the conductive structure 105 and conductive structure 107 where this near field coupling may occur may be referred to herein as a coupling mode region.

As shown in FIG. 1, the wireless power transmitter 110 may receive utility power at 50/60 Hz 102 and convert it to an alternating current (AC) at an operating frequency to drive the conductive structure 105. The wireless power transmitter 110 may include a rectifier 111 that converts the utility AC power into pulsating DC. For large loads, such as an electric vehicle charger, power factor correction circuitry 112 may be used to avoid excessive currents flowing in the utility grid and to filter the utility power at 50/60 Hz 102. The pulsating DC may be filtered by a large energy storage element 113 into a constant DC. The DC may then be converted to a square wave by an inverter circuit 114 and filtered into a sine wave by filter 115. This output may be then connected to a conductive structure 105 of a transmit circuit. The AC current flowing in the conductive structure 105 may create a time varying magnetic field 108. As stated, the transmit circuit may include conductive structure 105 and capacitor 116 to resonate at the frequency of operation, producing improved magnetic coupling between the conductive structure 105 and the conductive structure 107.

A conductive structure 107 in a receive circuit couples to the conductive structure 105 via magnetic field 108 and generates an AC power, which is connected to a wireless power receiver 120. The capacitor 121 and conductive structure 107 may form a resonant circuit at the frequency of operation, producing better magnetic coupling between the conductive structure 105 and the conductive structure 107. The AC power is converted to pulsating DC by rectifier 122. An energy storage device 123 may be included to smooth the pulsating DC into constant DC. A switch mode power supply 124 may be included to adjust the voltage to a value appropriate for charging a battery (not shown) via the output power 130. The wireless power transmitter 110 and wireless power receiver 120 may communicate by modulating the magnetic field 108, or on a separate communication channel 132 (e.g., Bluetooth, ZigBee, cellular, NFC, etc.).

As stated, efficient transfer of energy between the conductive structure 105 and conductive structure 107 occurs during matched or nearly matched resonance between the conductive structure 105 and the conductive structure 107 and are driven at that frequency by the wireless power transmitter 110. However, even when resonance between the conductive structure 105 and conductive structure 107 are not matched, energy may be transferred, although the efficiency may be affected. Transfer of energy occurs by coupling energy from the near field of the conductive structure 105 to the conductive structure 107 residing in the neighborhood where this near field is established rather than propagating the energy from the conductive structure 105 into free space. The near-field may correspond to a region in which there are strong reactive fields resulting from the currents and charges in the conductive structure 105 that do not radiate power away from the conductive structure 105. In some cases, the near-field may correspond to a region that is within about one ½π wavelength of the conductive structure 105 (and vice versa for the conductive structure 107) as will be further described below.

FIG. 2 is a functional block diagram of an exemplary wireless power transmitter 200 that may be used in the wireless power transfer system 100 of FIG. 1. FIG. 2 shows an exemplary configuration of a wireless power transmitter that may include functionality required to convert 50/60 Hz utility grid power into an AC that may be used to drive the transmit circuit including a conductive structure 205 and a capacitor 217, while other configurations are possible for other input power sources. 50/60 Hz utility grid power 202 may be conditioned by a line filter 211 to remove noise and damaging voltage spikes. A rectifier 212 may convert the 50/60 Hz AC to pulsating DC.

An active power factor correction circuit 213 may be included for regulatory purposes to avoid excess currents in the utility grid due to out of phase voltage and current and harmonic distortion due to the switching action of the rectifier 212. The active power factor correction circuit 213 may regulate its voltage output to be substantially constant. The power factor correction circuit 213 may regulate the flow of current from the utility grid so that it follows the utility grid voltage and appears as a resistive load with good power factor. The power factor correction circuit 213 may be similar to a switch mode power supply that draws current from the utility grid in a series of pulses that are modulated to match the utility grid voltage waveform.

An energy storage element 214 may be included and may be a very large capacitor or it may be composed of inductors and capacitors. In either case, the components may be large in order to store enough energy to last one half cycle of the 50/60 Hz utility grid power. Lower powered power supplies may omit the energy storage element 214, but the resulting AC power that drives the transmit circuit may then have a waveform of the rectified 50/60 Hz utility grid power superimposed as an envelope, leading to higher peak voltages and currents and higher peak magnetic fields. It may be desirable to avoid this at various power levels.

An inverter circuit 215 may be used to convert the rectified and smoothed DC produced by the previous components 211 to 214 and may chop the smoothed DC into a square wave at the frequency of operation of the transmit circuit. As an exemplary implementation, this frequency could be at 20 KHz, though any frequency could be used that leads to practical sized transmit circuit and receive circuit. Higher frequencies may allow smaller components to be used in the wireless power transmitter 200, while lower frequencies may lead to higher efficiency due to lower switching losses. Charging systems have been proposed to use frequencies in the range from 400 Hz to 1 MHz.

A matching circuit 216 may be included to perform dual duty as a filter to convert the square wave generated by inverter circuit 215 to a sine wave with suppressed harmonics and matches the impedance of the inverter circuit 215 to the resonant circuit made up of capacitor 217 and the conductive structure 205 of the transmit circuit. Since the matching circuit 216 is operating at a relatively high frequency, the components may be relatively small, but are preferably of high quality to avoid losses. Capacitor 217 may be in parallel with or series with the conductive structure 205 in the transmit circuit, but in any case may be of the highest quality to avoid loss as the current flowing in this device is multiplied by the operating Q of the resonant circuit. Similarly, the conductive structure 205 in the transmit circuit may be composed of high quality components to avoid loss. Litz wire may be used to increase surface area and make maximum use of the copper in the winding. Alternately the conductive structure 205 of the transmit circuit may be made of a metallic strip with the thickness, width and metal type selected to keep resistive losses low. Ferrite material used for the magnetic circuit may be selected to avoid saturation, eddy currents and loss at the frequency of operation.

The wireless power transmitter 200 may further include a load sensing circuit (not shown) for detecting the presence or absence of active receive coils in the vicinity of the magnetic field 208 generated by the transmit circuit. By way of example, a load sensing circuit monitors the current flowing to the inverter circuit 215, which is affected by the presence or absence of a properly aligned receive coil in the vicinity of the magnetic field 208. Detection of changes to the loading on the inverter circuit 215 may be monitored by a controller, not shown, for use in determining whether to enable the power factor correction circuit 213 for transmitting energy and to communicate with an active receive coil. A current measured at inverter circuit 215 may be further used to determine whether an invalid object is positioned within a charging region of transmit circuit.

FIG. 3 is a functional block diagram of an exemplary wireless power receiver system 300 that may be used in the wireless power transfer system 100 of FIG. 1. The receiver system 300 may convert the magnetic field 308 into an AC power that is converted to DC power 330 used to charge a battery (not shown) or power a device (not shown). The receive circuit includes an conductive structure 307 that together with capacitor 321 forms a resonant circuit. The comments of component quality for conductive structure 307 and capacitor 321 described above with reference to FIG. 2 apply here also. A matching circuit 322 may perform a similar function to matching circuit 213 only in reverse where the AC power generated by the receive circuit is impedance matched to a rectifier 323 and the harmonics generated by the rectifier 323 are not coupled to the receive circuit. The rectifier circuit 323 may be used to reduce the harmonics generated by the rectifying action and reduce the filtering requirements on the matching circuit 322. This may allow for providing a high power factor to increase the efficiency of power conversion to wirelessly receive power and provide that power to a load (e.g., a battery for charging).

An energy storage element 324 may be used to smooth pulsating DC into constant DC. The energy storage element 324 may operate at high frequencies (as compared to the energy storage element 214 of FIG. 2) so components may be smaller. A switch mode power supply 325 may be used to regulate the DC voltage and possibly the DC current in response to a battery management system (not shown). As an alternative, the regulating function of the switch mode power supply 325 may be provided within at the wireless power transmitter 200, but this approach may depend on a fast and reliable communications link from the wireless power receiver 300 to the wireless power transmitter 200 and may add complexity to the whole system.

Figure 4:
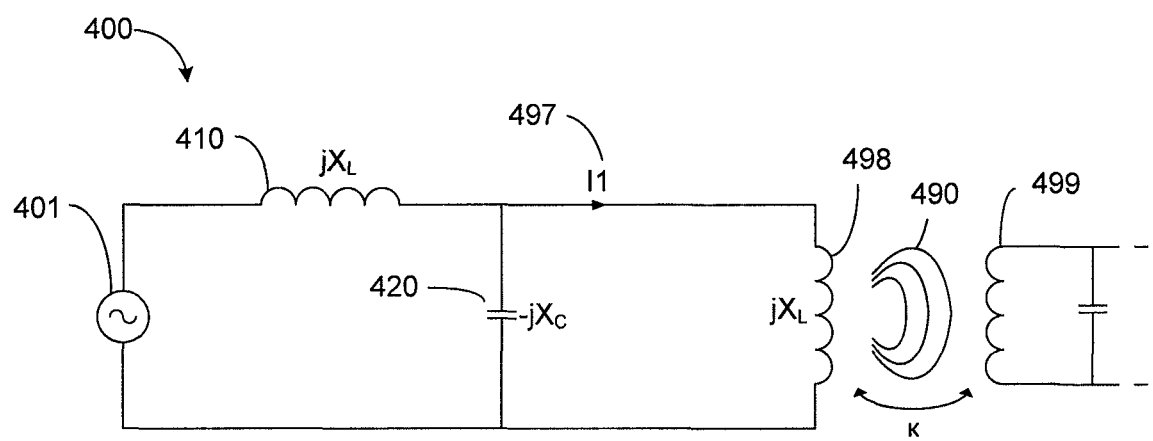
FIG. 4 is a simplified circuit schematic of a wireless power transmitter with an LCL resonant circuit.

FIG. 4 is a simplified circuit schematic of a wireless power transmitter with an LCL resonant circuit. As shown, the conductive structure 498 generates the magnetic field 490 to inductively couple to the conductive structure 499 for power transfer. On the transmit side, the conductive structure 498 is one of the inductors in the LCL resonant circuit which is powered by power source 401. Source 401 is representative of circuitry prior to the LCL resonant circuit, for example utility grid power 202, line filter 211, rectifier 212, power factor correction circuit 213, energy storage element 214, and inverter circuit 215 of FIG. 2, or some subset thereof. On the receive side, the conductive structure 499 may be conductive structure 307 of FIG. 3 (e.g., part of receive circuit). Further, the conductive structure 499 may be connected to capacitor 321, matching circuit 322, rectifier 323, energy storage element 324, switch mode power supply 325 of FIG. 3, to provide DC power 330. Conductive structures 498 and 499 may be thought of as primary and secondary coils, respectively, of a loosely coupled transformer.

The LCL resonant circuit, comprising inductor 410, capacitor 420, and conductive structure 498, has multiple functions. First, like matching circuit 216 of FIG. 2, the LCL resonant circuit may smooth the output of the source. An inverter circuit converts the DC output of a rectifier into an AC signal. This AC signal may include frequency components other than the operating frequency of the wireless power system and have non-sinusoidal waveform (e.g., a square wave). However, it may be desirable to have a sinusoidal input to the transmit coil at the operating frequency of the system for energy transfer. Thus, the LCL resonant circuit may filter non-operating frequency components output from the inverter circuit to produce a sinusoidal excitation signal for the resonant circuit. Second, conductive structure 498 and capacitor 420 serve as the transmit circuit (e.g., a conductive structure 205 and capacitor 217 in FIG. 2). Thus, a portion of the LCL resonant circuit serves as the transmit coil for wireless power transfer, reducing system complexity as compared systems implementing other matching circuits between a power source and resonant coil. The resonant frequency of the system, or tuning of the wireless power transmitter, is thus set by the inductance L of conductive structure 498 and capacitance C of capacitor 420. Finally, the LCL resonant circuit as coupled to a receive side load performs an impedance transformation such that the impedance as seen by the source allows for efficient energy transfer. More specifically, in combination with the impedance conversion through the LCL network, with the capacitor 420 having reactance $X_C$ and inductor 410 and conductive structure 498 each having an inductive reactance $X_L$, and where $X_L$ equals $X_C$, it can be shown that the impedance as seen by the source is the reflected impedance of the receive side load via the inductive coupling between conductive structures 498 and 499. Thus, variations in the receive side load are reflected to the source and losses in the matching network are minimized. In some embodiments, the conductive structure may include a single loop, coil, or antenna having reactance $X_L$. In other embodiments, the conductive structure may include a plurality of loops, coils, or antenna in electrical configuration such that the equivalent reactance is $X_L$. The plurality of loops, coils, or antenna may be relatively located in space to adjust the generated magnetic field.

As discussed above, driving each coil with a separate source in a multiple coil transmitter increases the cost, size, and complexity of the transmitter. Accordingly, the present disclosure relates to a power supply topology for a wireless power transmitter that allows a single drive signal from a power source to selectively energize or disable the primary coils during operation while maintaining the tuning of the transmitter. By selectively energizing the primary coils, the shape and strength of the generated magnetic field may be altered to improve the coupling between the primary coil(s) and the secondary coil.

Figure 5A:
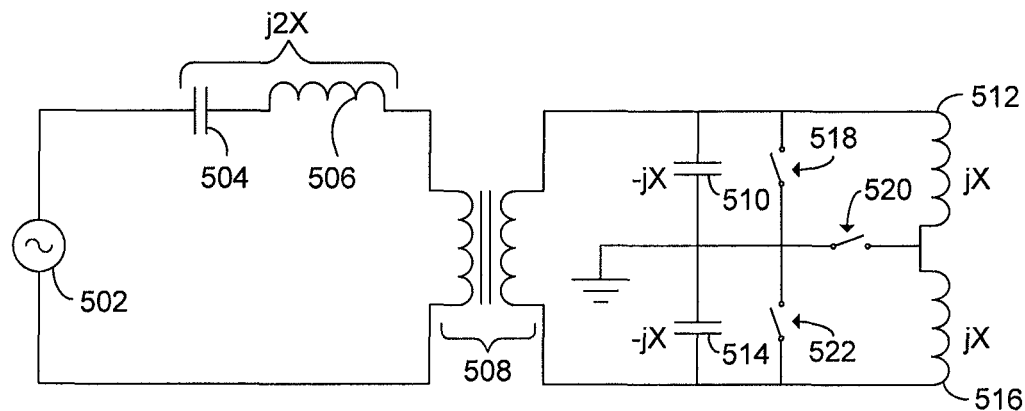
FIG. 5A is a simplified circuit schematic of an embodiment of a wireless power transmitter with a shunt-switch topology.

FIG. 5A is a simplified circuit schematic of an embodiment of a wireless power transmitter with a shunt-switch topology. In this embodiment, a source 502 may selectively energize one or both of the conductive structures 512 and 516 via a drive signal. The two conductive structures may comprise two primary coils, each capable of generating a magnetic field. The first inductive branch of the LCL resonant circuit comprises an inductor 506 and capacitor 504 such that the total reactance is inductive with an impedance of j2X. A transformer 508 may be optionally included to isolate the source and the first inductive "L" branch of the LCL resonant circuit. On the capacitive branch of the LCL resonant circuit, two capacitors 510 and 514 are connected in series, each having an impedance −jX. Lastly, the second inductive branch of the LCL resonant circuit includes two conductive structures 512 and 516, connected in series, each having an impedance of jX. The conductive structures and capacitors are then connected in parallel, forming the transmit circuit of the wireless power transmitter. Compared to the transmit circuit of FIG. 4, series components divide the impedances of the capacitive branch and of the second inductive branch of the LCL resonant circuit.

Referring back to FIG. 5A, Switches 518, 520, and 522 may reconfigure the conductive pathway through capacitors 510 and 514 and conductive structures 512 and 516. Depending on the switch state either one, both, or neither of the conductive structures may be energized. A switch 518 (with switch 520) may selectively shunt current around the capacitor 510 and the conductive structure 512 to a node located between the series capacitors and conductive structures, effectively removing capacitor 510 and conductive structure 512 from the circuit. Similarly, a switch 522 (with switch 520) may selectively shunt current around the capacitor 514 and the conductive structure 516. Depending on the state of switches 518 and 522, the switch 520 may selectively route the shunted current through either conductive structure 512 or 516. With switches 518 and 522 in a closed state, current may bypass both conductive structures, disabling power transfer.

Conductive structures 512 and 516 may be physically identical or distinct and positioned to improve coupling to a receiver. For example, conductive structure 512 may be positioned orthogonal or adjacent to a similar conductive structure 516. As another example, conductive structure 512 by positioned coaxially with a dissimilar conductive structure 516.

Figure 5B:
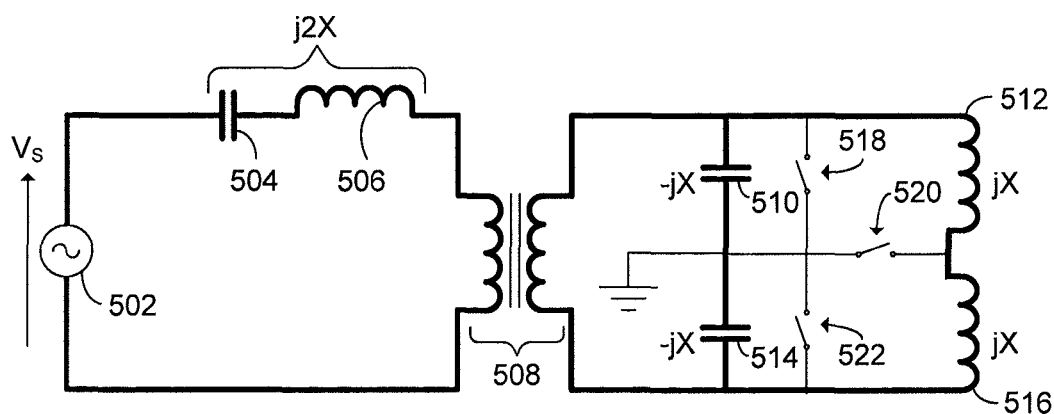
FIGS. 5B-5D are simplified circuit schematics of a wireless power transmitter with a shunt-switch topology configured to drive either one or both of the conductive structures.
Figure 5C:
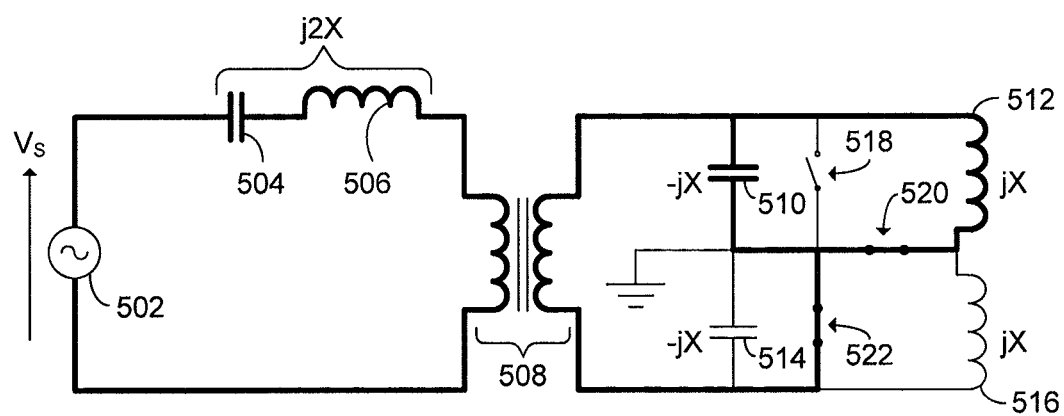
Figure 5D:
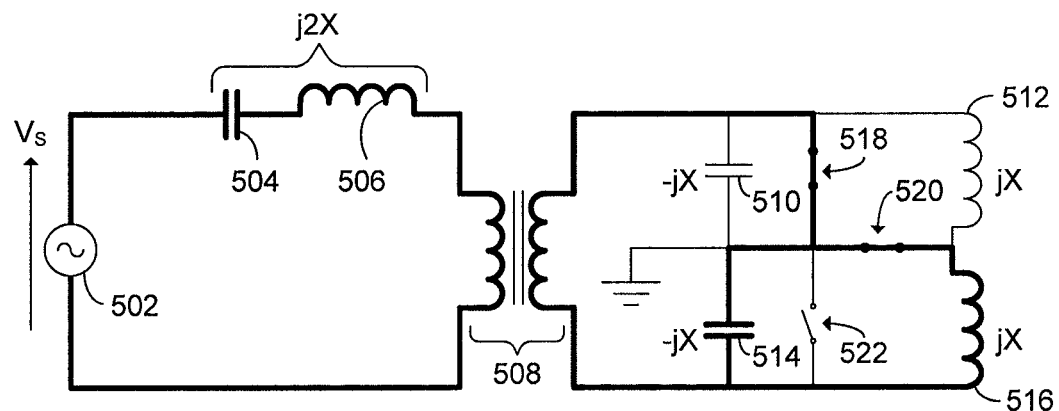

FIGS. 5B-5D are simplified circuit schematics of a wireless power transmitter with a shunt-switch topology configured to drive either one or both of the conductive structures. Current flow is indicated by the bold paths. With reference to FIG. 5B, with switches 518, 520, and 522 all in an open state, the two capacitors 510 and 514 and two conductive structures 512 and 516 form the transmit circuit. In this configuration, the series capacitors have an equivalent impedance of –j2X and series conductive structures have an equivalent impedance of j2X, forming a resonant transmit circuit.

The position of the secondary coil relative to the conductive structures 512, 516 may impact the impedance as seen by the source 502 through each conductive structure. If the conductive structures 512 and 516 were connected in parallel, the conductive structure having a better alignment with the secondary coil would exhibit higher impedance than the other conductive structure, reducing current flow through the better-aligned conductive structure and negatively impacting power transfer. However, because the conductive structures are connected in series, an equal amount of current flows through both and negates the impact of the unbalanced conductive structure impedances. Like in FIG. 4, with the first inductive branch having an equivalent impedance of j2X, all three branches of the LCL resonant circuit have an equivalent reactance 2X and the LCL resonant circuit has a characteristic impedance of 2X. The impedance of the individual inductors and capacitors of the LCL resonant circuit can be equal to 2X, or twice the impedance of a single network. The impedance can be the "designed" impedance of the LCL network circuit, not the load impedance of the LCL network circuit.

FIG. 5C depicts the configuration where switches 520 and 522 are in a closed state, effectively removing capacitor 514 and conductive structure 516 from the circuit. The capacitor 510 having impedance –jX and the conductive structure 512 having impedance jX form the transmit circuit. Similarly, FIG. 5D depicts the configuration where switches 518 and 520 are in a closed state, effectively removing capacitor 510 and conductive structure 512 from the circuit. The capacitor 514 having impedance –jX and the conductive structure 516 having impedance jX form the transmit circuit. Because the capacitance of the capacitor and inductance of the conductive structure remain proportional in these configurations (–jX and jX) to that of FIG. 8B (–j2X and j2X), the transmitter remains tuned to the same resonant frequency. Further, in these configurations the characteristic impedance of the LCL resonant circuit changes from 2X to X. The value of 2X and X can be the equivalent impedance (or characteristic impedance) of the LCL network circuit. With the source 502 voltage constant, the reduced impedance doubles the current flowing through the energized conductive structure relative to the configuration shown in FIG. 5B. The actual amount of current flowing through the conductive structure is impacted by an imbalance of the branches of the LCL resonant circuit, discussed below with respect to FIG. 6.

Figure 6:
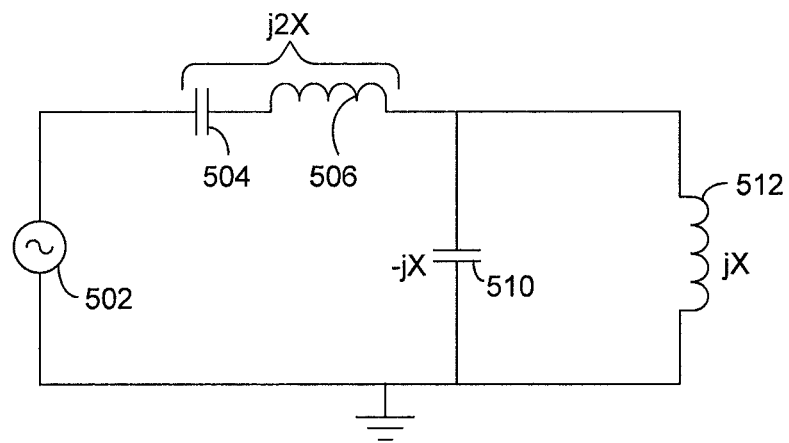
FIG. 6 is an equivalent circuit schematic of the circuit shown in FIG. 5C.

FIG. 6 is an equivalent circuit schematic of the circuit shown in FIG. 5C. Assuming the transformer 508 is ideal with a 1:1 turns ratio, and by removing the shunted capacitor 514 and inductor 516, the circuit in FIG. 5C can be reduced to the circuit in FIG. 6. By switching out capacitor 514 and conductive structure 516, the three branches of the LCL resonant circuit no longer have equivalent impedances. As a result, the source 502 sees additional reactive loading, shifting the phase and magnitude of the current flowing through conductive structure 512. This increases the amount of reactive power in the transmitter, reducing the amount of real power delivered to the load and consequentially reducing the power factor of the circuit.

Figure 7A:
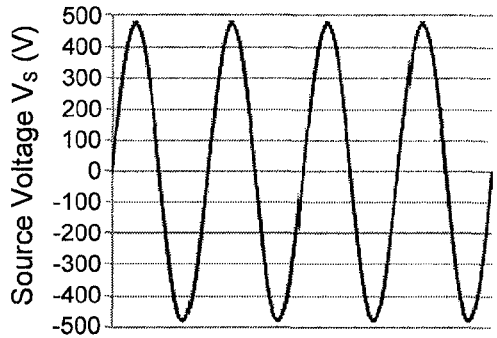
FIGS. 7A-7D are voltage a current waveforms from a simulation of the circuit shown in FIG. 5B.
Figure 7E:
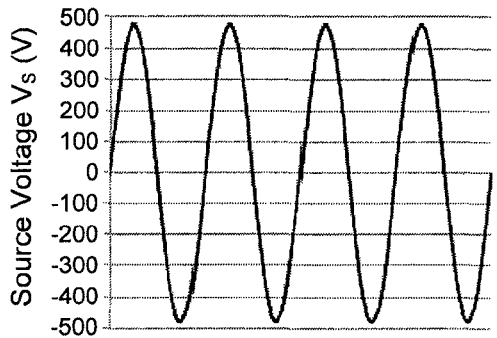
FIGS. 7E-7H are voltage a current waveforms from a simulation of the circuit shown in FIG. 5C.
Figure 7B:
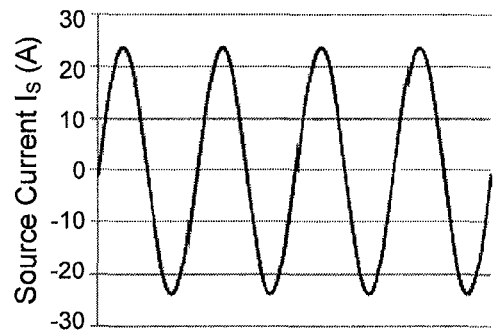
Figure 7F:
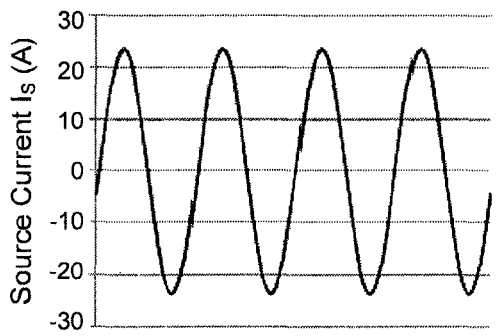
Figure 7C:
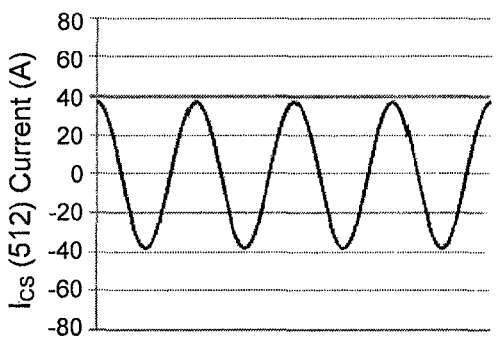
Figure 7G:
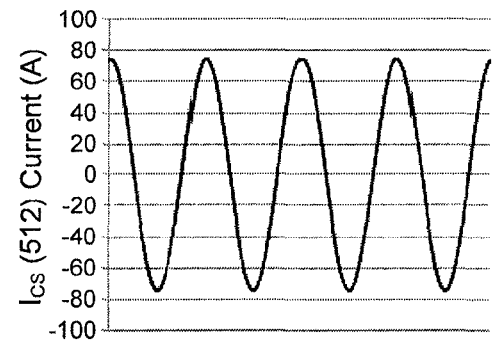
Figure 7D:
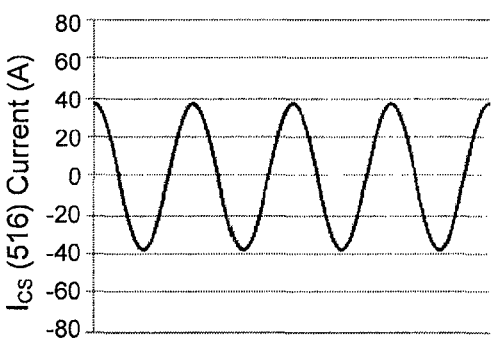
Figure 7H:
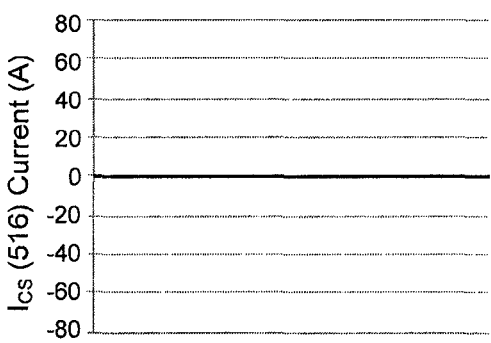

FIGS. 7A-7D are voltage a current waveforms from a simulation of the circuit shown in FIG. 5B. With switches 518, 520, and 522 in an open state, source 502 energizes both conductive structures 512 and 516. The source outputs a relatively constant amount of power as shown by the voltage and current waveforms in FIGS. 7A and 7B. Due to the series configuration of the conductive structures, FIGS. 7C and 7D show the current through each conductive structure is identical.

FIGS. 7E-7H are voltage a current waveforms from a simulation of the circuit shown in FIG. 5C. With switches 520 and 522 in a closed state, source 502 only energizes conductive structure 512. FIGS. 7E and 7F show that the source continues to output a relatively constant amount of power comparable to the output shown in FIGS. 7A and 7B. Because the characteristic impedance of the LCL resonant circuit in this configuration is reduced from 2X to X, the current flowing through conductive structure 512 is doubled and the current through the conductive structure 516 is zero.

Figure 7I:
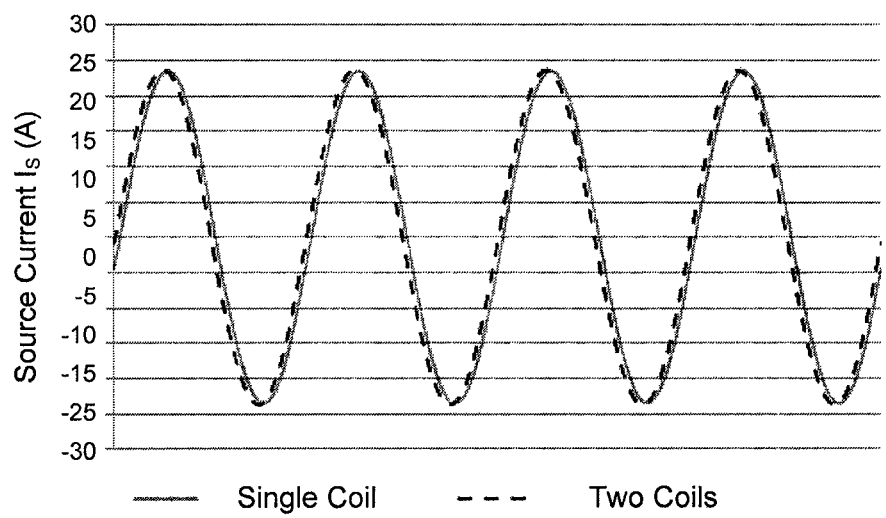
FIG. 7I depicts two current waveforms comparing simulation results from the configurations of FIGS. 5B and 5C.

FIG. 7I depicts two current waveforms comparing simulation results from the configurations of FIGS. 5B and 5C. As discussed, when energizing a single conductive structure the additional reactive component introduced due to the impedance mismatch of the branches in the LCL resonant circuit causes the phase and magnitude of the current flowing through the energized conductive structure to change relative to driving both conductive structures. In simulating the configurations of FIGS. 5B and 5C, the source was delivering approximately 5 kilowatts of power. As shown in FIG. 7I, the current in the single conductive structure configuration is lagging behind the current in the two conductive structure configuration due to the additional inductive reactance of the first branch of the LCL resonant circuit. However, the LCL resonant circuit, which is designed for use as a primary power supply, is generally insensitive to the mistuning the first series inductance of the LCL circuit. Thus, the introduced phase delay and increased current magnitude are relatively small and thus negligibly impact power transfer efficiency and peak power transfer.

The shunt-switch topology has several advantages. First, it allows a single power source (e.g., an inverter) to drive both conductive structures. Second, beyond equalizing the current, the series configuration of the two conductive structures minimizes their cross coupling. Third, the voltage differential across switch 520 may be used to monitor the loading imbalance between the two conductive structures. A loading imbalance may arise when the receiver coil has a greater coupling coefficient to one of the two conductive structures 512, 516. Thus, by monitoring the voltage differential across switch 520, a controller (not shown) may determine whether it is appropriate to switch on or off one of the conductive structures. In conditions in which the voltage stress on switch 520 is under a common main voltage stress level, a specialized switch for high voltage applications is generally not utilized.

Figure 8A:
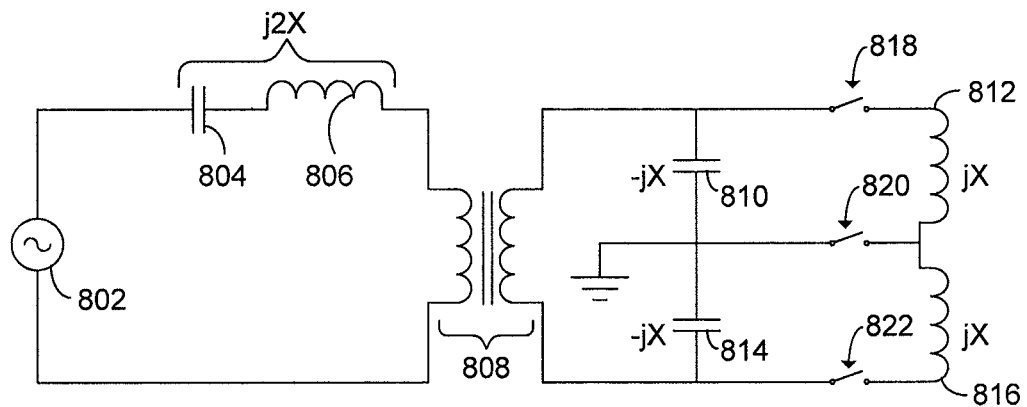
FIG. 8A is a simplified circuit schematic of an embodiment of a wireless power transmitter with a series-switch topology.

FIG. 8A is a simplified circuit schematic of an embodiment of a wireless power transmitter with a series-switch topology. In this embodiment, a single source 802 may selectively energize one or both of the conductive structures 812 and 816 via a drive signal. The two conductive structures may comprise two primary coils, each capable of generating a magnetic field. The first inductive branch of the LCL resonant circuit comprises an inductor 806 and capacitor 804 such that the total reactance is inductive with an impedance of j2X. A transformer 808 may be optionally included to isolate the source and the first inductive "L" branch of the LCL resonant circuit. On the capacitive branch of the LCL resonant circuit, two capacitors 810 and 814 are connected in series, each having an impedance −jX. Lastly, the second inductive branch of the LCL resonant circuit includes two conductive structures 812 and 816, connected in series, each having an impedance of jX. The conductive structures and capacitors are then connected in parallel, forming the transmit circuit of the wireless power transmitter.

Switches 818, 820, and 822 may reconfigure the conductive pathway through capacitors 810 and 814 and conductive structures 812 and 816. Depending on the switch state either one, both, or neither of the conductive structures may be energized. By closing either switches 818 and 820, switches 820 and 822, or switches 818 and 822, current may flow through conductive structure 812, conductive structure 816, or both conductive structures 812 and 816, respectively. With all three switches in an open state, no current flows through either conductive structure, disabling power transfer.

Again, conductive structures 812 and 816 may be physically identical or distinct and positioned to improve coupling to a receiver. For example, conductive structure 812 may be positioned orthogonal or adjacent to a similar conductive structure 816. As another example, conductive structure 812 by positioned coaxially with a dissimilar conductive structure 816.

Figure 8B:
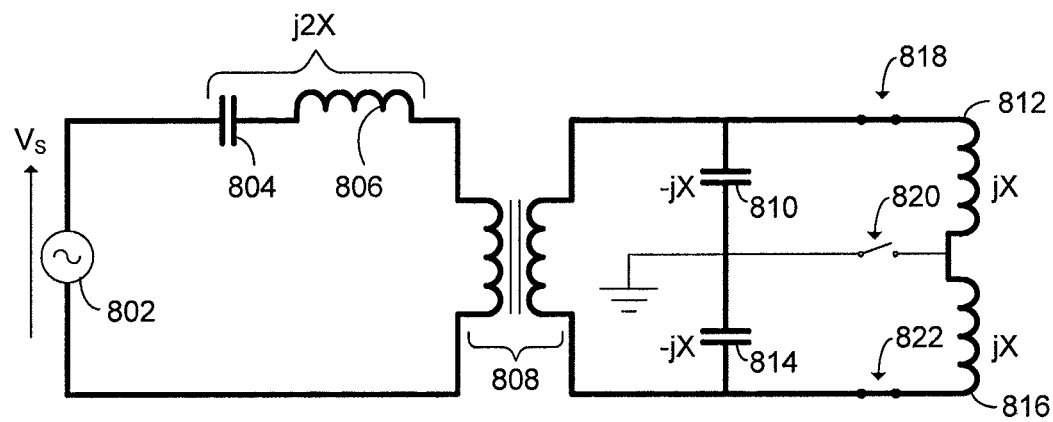
FIGS. 8B-8D are simplified circuit schematics of a wireless power transmitter with a series-switch topology configured to drive either one or both of the conductive structures.
Figure 8C:
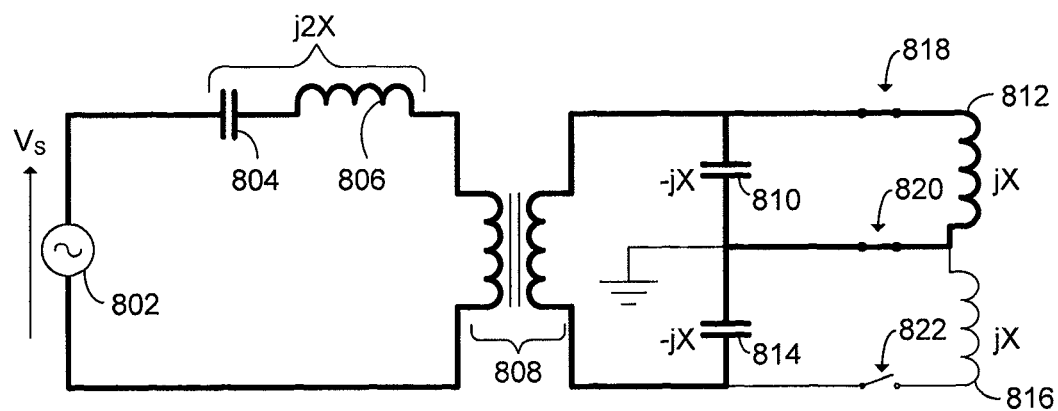
Figure 8D:
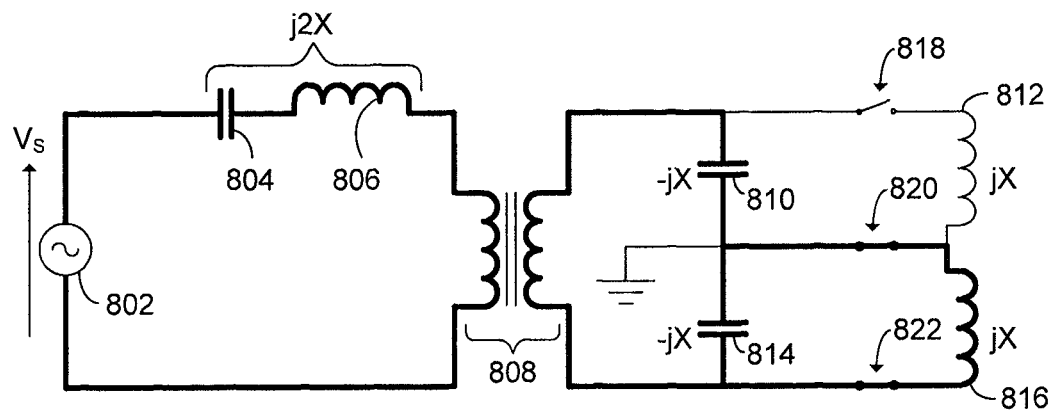

FIGS. 8B-8D are simplified circuit schematics of a wireless power transmitter with a series-switch topology configured to drive either one or both of the conductive structures. Current flow is indicated by the bold paths. With reference to FIG. 8B, with switches 818 and 822 in a closed state and switch 820 in an open state, the two capacitors 810 and 814 and two conductive structures 812 and 816 form the transmit circuit. In this configuration, the series capacitors have an equivalent impedance of −j2X and series conductive structures have an equivalent impedance of j2X, forming a resonant transmit circuit.

As previously discussed, the position of the secondary coil relative to the conductive structures 812, 816 may impact the impedance as seen by the source 802 through each conductive structure. With the conductive structures connected in series, this configuration, like the configuration in FIG. 5, an equal amount of current flows through both conductive structures and negates the impact of the unbalanced conductive structure impedances. Like in FIG. 4, with the first inductive branch having an equivalent impedance of j2X, all three branches of the LCL resonant circuit have an equivalent reactance 2X and the LCL resonant circuit has a characteristic impedance of 2X.

FIG. 8C depicts the configuration where switches 818 and 820 are in a closed state, effectively removing conductive structure 816 from the circuit. The capacitor 810 having impedance −jX and the conductive structure 812 having impedance jX form the transmit circuit. Similarly, FIG. 8D depicts the configuration where switches 820 and 822 are in a closed state and switch 818 is in an open state, effectively removing conductive structure 812 from the circuit. The capacitor 814 having impedance −jX and the conductive structure 816 having impedance jX form the transmit circuit. Because the capacitance of the capacitor and inductance of the conductive structure remain proportional in these configurations (−jX and jX) to that of FIG. 8B (−j2X and j2X), the transmitter remains tuned to the same resonant frequency. Further, in these configurations the characteristic impedance of the LCL resonant circuit changes from 2X to X. With the source 802 voltage constant, the reduced impedance doubles the current flowing through the energized conductive structure relative to the configuration shown in FIG. 8B.

Figure 9A:
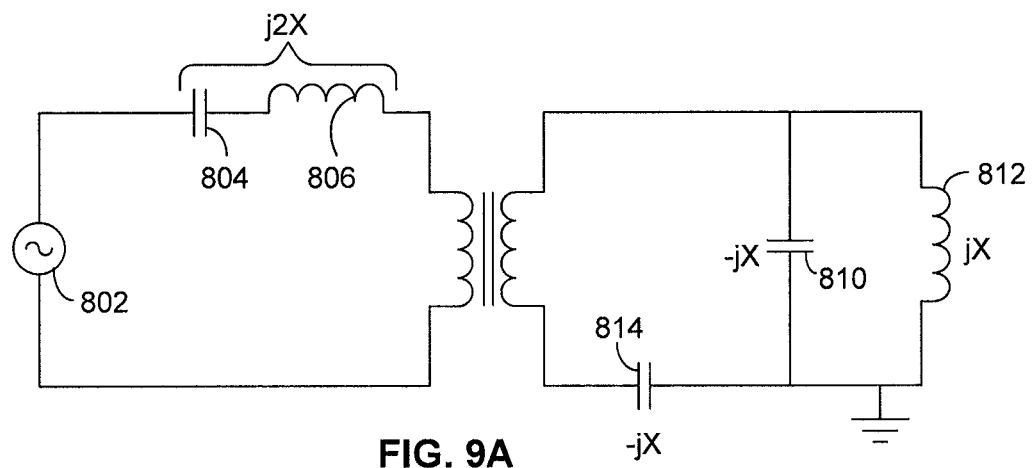
FIGS. 9A and 9B are equivalent circuit schematics of the circuit shown in FIG. 8C.
Figure 9B:
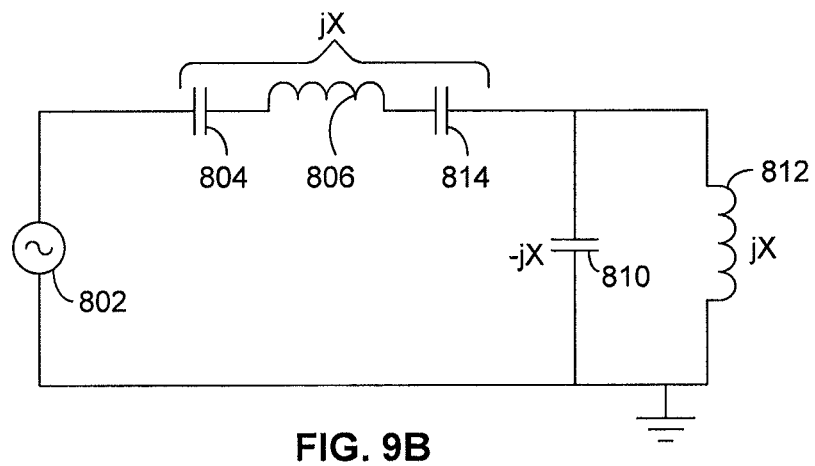

FIGS. 9A and 9B are equivalent circuit schematics of the circuit shown in FIG. 8C. As compared to the shunt-switch topology, by closing switches 818 and 820 and opening switch 822, capacitor 814 is switched into series with the conductive structure 812. As a result, capacitor 814 is switched from acting as a tuning capacitor when both conductive structures are energized to acting as a further capacitive reactance on the input branch of the LCL resonant circuit. Similarly, by closing switches 820 and 822 and opening switch 818, capacitor 810 is switched into series with the conductive structure 816, again switching from acting as a tuning capacitor when both conductive structures are energized to acting as a further capacitive reactance on the input branch of the LCL resonant circuit. Either capacitor 810 or 814, with impedance −jX, in series with inductor 806 and capacitor 804 having a combined impedance of j2X, results in an input branch to the LCL resonant circuit having an equivalent impedance of jX. As compared to the shunt-switch topology, the three branches of the LCL resonant circuit in the series-switch topology have equal impedances, introducing no additional reactive loading and no shift is introduced to the phase and magnitude of the current flowing through the energized conductive structure. Thus, the full amount of power output delivered by the source 802 is used to drive the load, achieving a similar power factor to the two energized conductive structure configuration.

Figure 10A:
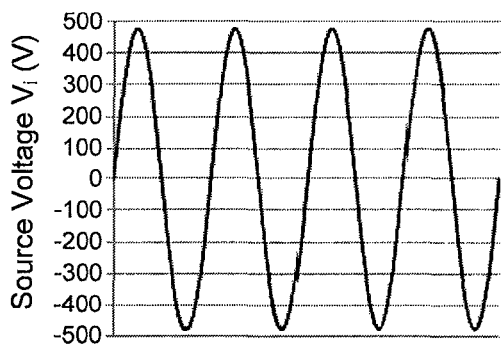
FIGS. 10A-10D are voltage a current waveforms from a simulation of the circuit shown in FIG. 8B.
Figure 10B:
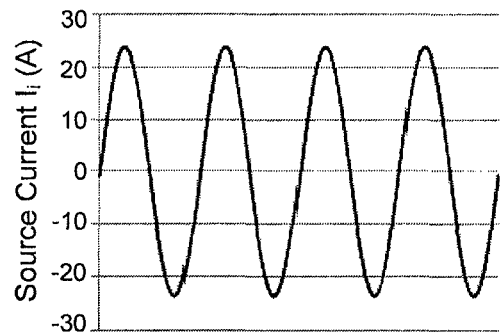
Figure 10C:
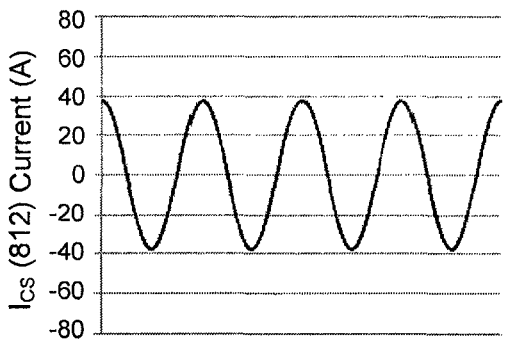
Figure 10D:
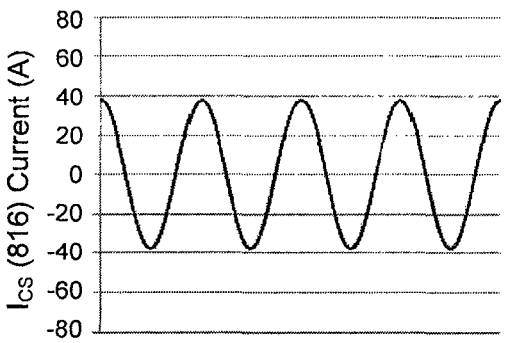

FIGS. 10A-10D are voltage a current waveforms from a simulation of the circuit shown in FIG. 8B. With switches 818 and 822 in a closed state and switch 820 in an open state, source 802 energizes both conductive structures 812 and 816. The source outputs a relatively constant amount of power as shown by the voltage and current waveforms in FIGS. 10A and 10B. Due to the series configuration of the conductive structures, FIGS. 10C and 10D show the current through each conductive structure is identical.

Figure 10E:
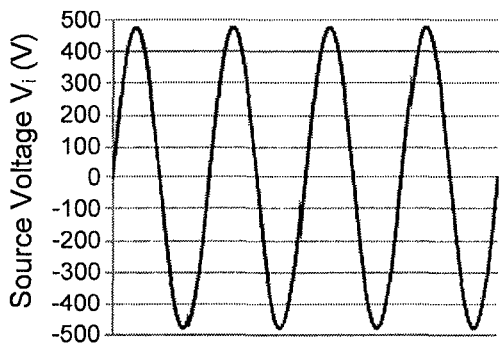
FIGS. 10E-10H are voltage a current waveforms from a simulation of the circuit shown in FIG. 8C.
Figure 10F:
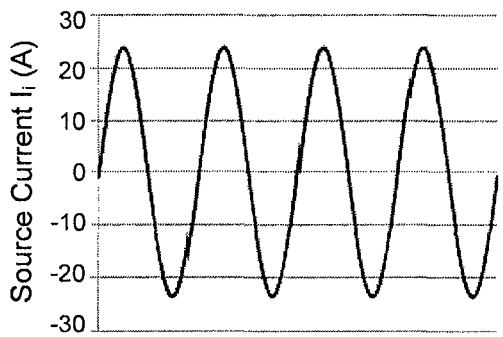
Figure 10G:
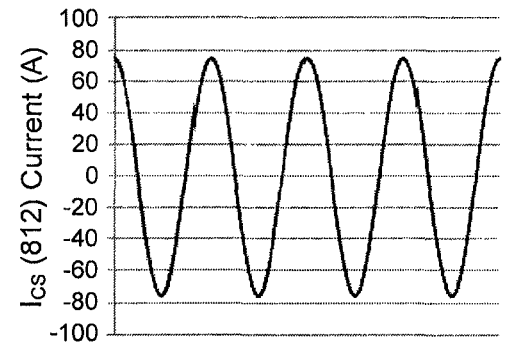
Figure 10H:
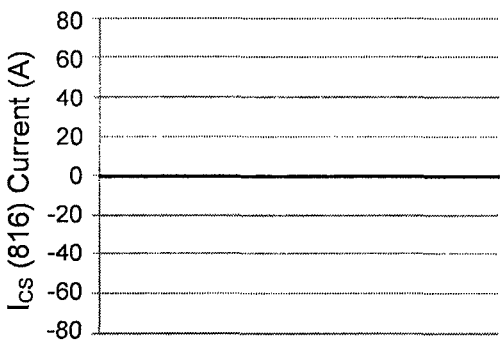

FIGS. 10E-10H are voltage a current waveforms from a simulation of the circuit shown in FIG. 8C. With switches 818 and 820 in a closed state and switch 822 in an open state, source 802 only energizes conductive structure 812. FIGS. 10E and 10F show that the source continues to output a relatively constant amount of power comparable to the output shown in FIGS. 10A and 10B. Because the characteristic impedance of the LCL resonant circuit in this configuration is now halved, the current flow through conductive structure 812 is doubled and the current through conductive structure 816 is zero.

The series-switch topology has several advantages. First, it allows a single power source (e.g., an inverter) to drive both conductive structures. Second, beyond equalizing the current, the series configuration of the two conductive structures minimizes their cross coupling. Third, the voltage differential across switch 820 may be used to monitor the loading imbalance between the two conductive structures, as discussed above. Finally, when energizing either conductive structure 812 or 816, the series-switch topology switches the capacitor associated with the disabled conductive structure from acting as a tuning capacitor to acting as a further capacitive reactance on the input branch of the LCL resonant circuit, balancing the impedances of the LCL branches and avoiding the introduction of any additional reactive loading as seen in the shunt-switch topology.

A wireless power transmitter may include a controller to control the state of the switches in either the shunt-switch or series-switch topology. The controller may be connected to one or more voltage and/or current sensors located within the transmitter to measure the magnitude and/or phases of various signals. For example, a sensor may be used to monitor the voltage across or current through an energized conductive structure. The measurements may be used to evaluate the whether a wireless power receiver is present and, if so, the degree of loading on each conductive structure so to determine the optimal switch configuration for wireless power transfer. The controller may also use information sent from a wireless power receiver via a separate communication channel to determine the optimal switch configuration dynamically during power transmission. The optimal configuration may vary depending on the desired operation of the wireless power transmitter. For example, the controller may maximize the amount of power delivered to the wireless power receiver, the efficiency of power transfer from the wireless power receiver to the wireless power transmitter, or disable power transfer by disconnecting or bypassing both conductive structures from the drive signal generated by the source.

One example application of the power supply topologies described above is in wireless power transmitters for the deployment of electric vehicle systems. An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, conveyer devices, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 11:
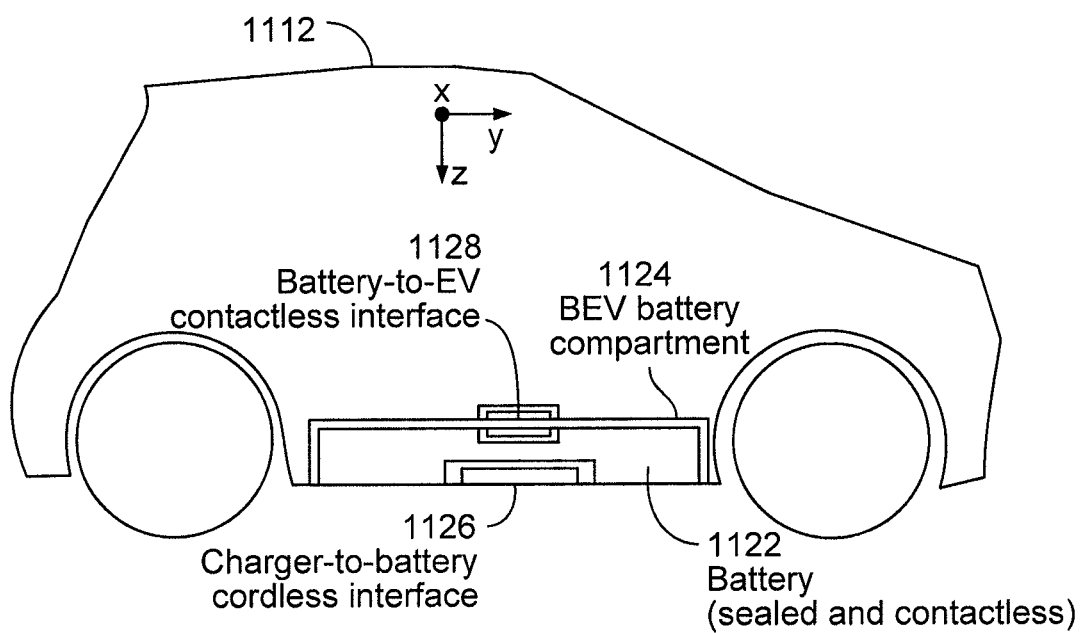
FIG. 11 is a functional block diagram showing a replaceable contactless battery disposed in an exemplary electric vehicle.

A wireless power transfer system may be used with a variety of electric vehicles including rechargeable or replaceable batteries. FIG. 11 is an exemplary functional block diagram showing a replaceable contactless battery disposed in an electric vehicle 1112. The low battery position may be useful for an electric vehicle battery unit that integrates a wireless power interface (e.g., a charger-to-battery cordless interface 1126) and that may receive power from a wireless power transmitter (not shown) below the vehicle or embedded in the ground. In FIG. 11, the electric vehicle battery unit may be a rechargeable battery unit, and may be accommodated in a battery compartment 1124. The electric vehicle battery unit also provides a wireless power interface 1126, which may integrate the entire electric vehicle wireless power receiver including a resonant conductive structure, power conversion circuitry, and other control and communications functions as needed for efficient and safe wireless energy transfer between a wireless power transmitter and the electric vehicle battery unit (See FIGS. 1 and 3). Note the wireless power transfer system as used in an electric vehicle application and incorporating the power supply topology disclosed herein may facilitate bidirectional power transfer, thus a conductive structure may act to either receive or transmit energy. This allows an EV owner to sell stored energy at times of high utility power demand (e.g., during the day) and purchase energy at times of low utility power demand (e.g., during the night).

It may be useful for the electric vehicle conductive structure to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power receiver. The electric vehicle battery unit 1122 may also include a battery-to-EV cordless interface 1122, and a charger-to-battery cordless interface 1126 that provides contactless power and communication between the electric vehicle 1112 and a wireless power transmitter.

Figure 12:
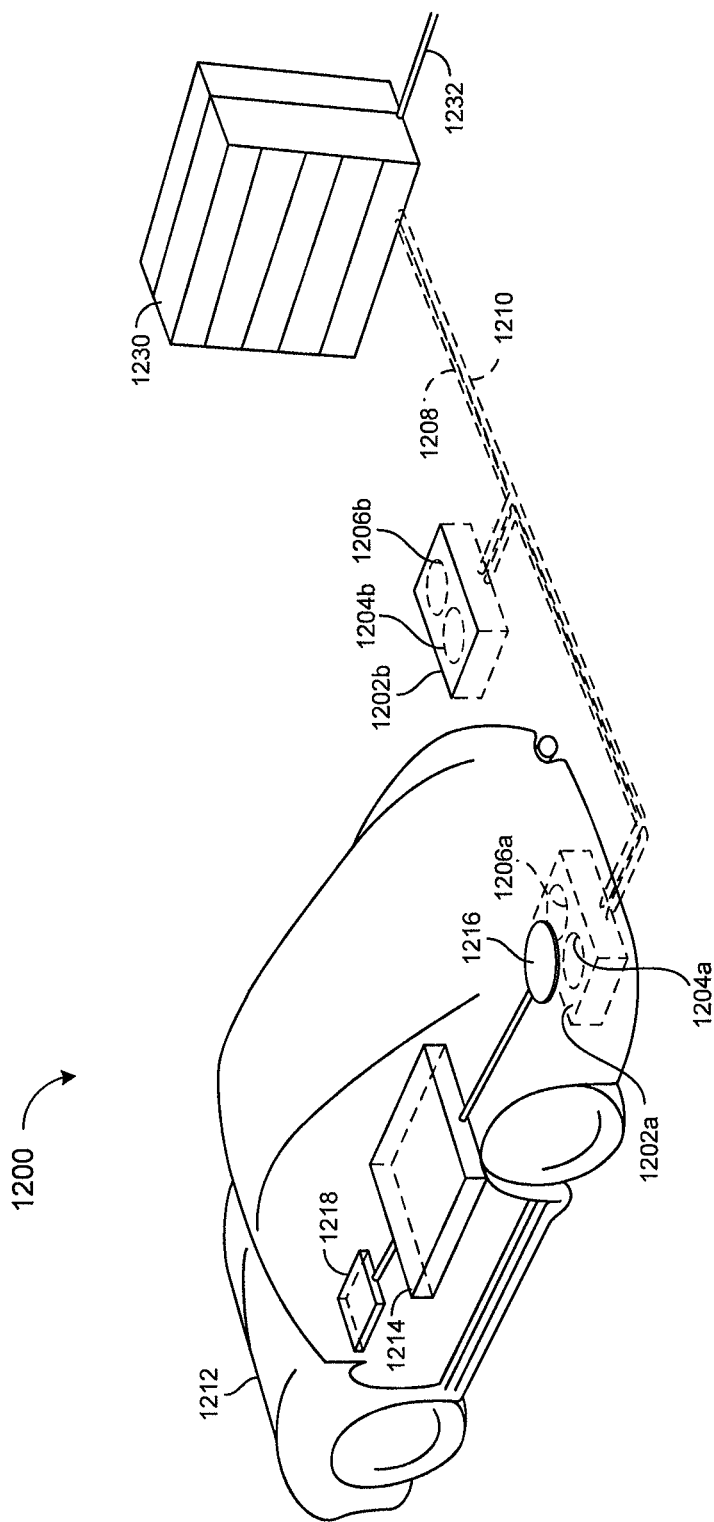
FIG. 12 is a diagram of an exemplary wireless power transfer system for charging an electric vehicle.

FIG. 12 is a diagram of an exemplary wireless power transfer system 1200 for charging an electric vehicle 1212. The wireless power transfer system 1200 enables charging of an electric vehicle 1212 while the electric vehicle 1212 is parked near a base 1202a. Spaces for two electric vehicles are illustrated in a parking area to be parked over corresponding base 1202a and 1202b. A distribution center 1230 may be connected to a power backbone 1232 and configured to provide an alternating current (AC) or a direct current (DC) supply through a power link 1210 to the base 1202a, depending on siting of the other components (e.g., line filter 211 and rectifier 212 of FIG. 2). The base 1202a also includes conductive structures 1204a and 1206a for wirelessly transferring or receiving power. In this particular depiction, the two conductive structures are adjacent to each other. An electric vehicle 1212 may include a battery unit 1218, an electric vehicle conductive structure 1216, and an electric vehicle wireless charging system 1214. Depending on the alignment of the electric vehicle conductive structure 1216 to the base 1202a, improved efficiency or power throughput may result from energizing either one or both of base conductive structures 1204a and 1206a. For example, if a controller determines electric vehicle conductive structure 1216 and base conductive structure 1206a are weakly coupled, the series- or shunt-switch topologies described above may be used to direct all of the current sourced from a source, here distribution center 1230, to base conductive structure 1204a. Then, the electric vehicle conductive structure 1216 may interact with the base conductive structure 1204a via a region of the electromagnetic field generated by the base conductive structure 1204a.

The electric vehicle conductive structure 1216 may receive power when the electric vehicle conductive structure 1216 is located in an energy field produced by either one or both of the base conductive structures 1204a and 1206a. The field corresponds to a region where energy output by the base conductive structures 1204a, 1206a may be captured by an electric vehicle conductive structure 1216. For example, the energy output by the base conductive structures 1204a, 1206a may be at a level sufficient to charge or power the electric vehicle 1212. In some cases, the field may correspond to the "near field" of the base conductive structures 1204a, 1206a. The near-field may correspond to a region in which there are strong reactive fields resulting from the currents and charges in the base conductive structures 1204a, 1206a that do not radiate power away from the respective base conductive structures 1204a, 1206a. In some cases the near-field may correspond to a region that is within about $1/2\pi$ of a wavelength at the operating frequency of the base conductive structures 1204a, 1206a (and vice versa for the electric vehicle conductive structure 1216) as will be further described below.

Local distribution 1230 may be configured to communicate with external sources (e.g., a power grid) and with the base 1202a via one or more communication links (not shown).

The electric vehicle conductive structure 1216 may be aligned to base conductive structures 1204a, 1202a so located within a near-field region simply by the driver positioning the electric vehicle 1212 correctly relative to the base conductive structures 1204a, 1206a. Not only do base conductive structures 1204a, 1206a allow for a larger error in alignment, they may improve overall power transfer as compared to a single conductive structure by "shaping" the magnetic field or adjusting the field strength to increase the magnetic flux passing through electric vehicle conductive structure 1216. To aid in alignment, the driver may be given visual feedback, auditory feedback, or combinations thereof to determine when the electric vehicle 1212 is properly placed for wireless power transfer. Alternatively, the electric vehicle 1212 may be positioned by an autopilot system, which may move the electric vehicle 1212 back and forth (e.g., in zig-zag movements) until an alignment error has reached a tolerable value. This may be performed automatically and autonomously by the electric vehicle 1212 without or with only minimal driver intervention provided that the electric vehicle 1212 is equipped with a servo steering wheel, ultrasonic sensors, and intelligence to adjust the vehicle. Alternatively, the electric vehicle conductive structure 1216, the base conductive structures 1204a, 1206a, or a combination thereof may have functionality for displacing and moving the conductive structures 1216, 1204a, and 1206a relative to each other to more accurately orient them and develop more efficient transmitter-receiver coupling.

The base 1202a may be located in a variety of locations. As non-limiting examples, some suitable locations include a parking area at a home of the EV owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 1200. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 1212 may be used as distributed storage devices to stabilize a power grid, a docking-to-grid solution may be used to increase availability of vehicles for Vehicle-to-Grid (V2G) operation.

A wireless power transfer system 1200 as described with reference to FIG. 12 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base 1202a transfers power to the electric vehicle 1212 and the electric vehicle 1212 transfers power to the base 1202a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

With continued reference to FIG. 12, the base conductive structures 1204a, 1206a and the electric vehicle conductive structure 1216 may be in a fixed position and the conductive structures brought within a near-field coupling region by overall placement of the electric vehicle conductive structure 1216 relative to the base 1202a. However, in order to perform energy transfer rapidly, efficiently, and safely, the distance between the base conductive structures 1204a, 1206a and the electric vehicle conductive structure 1216 may need to be reduced to improve coupling. Thus, the base conductive structures 1204a, 1206a and/or the electric vehicle conductive structure 1216 may be deployable and/or moveable to bring them into better alignment.

With continued reference to FIG. 12, the charging systems described above may be used in a variety of locations for charging an electric vehicle 1212, or transferring power back to a power grid. For example, the transfer of power may occur in a parking lot environment. It is noted that a "parking area" may also be referred to herein as a "parking space." To enhance the efficiency of a vehicle wireless power transfer system 1200, an electric vehicle 1212 may be aligned along an X direction and a Y direction to enable an electric vehicle conductive structure 1216 within the electric vehicle 1212 to be adequately aligned with a base 1202a within an associated parking area.

Furthermore, the disclosed embodiments are applicable to parking lots having one or more parking spaces or parking areas, wherein at least one parking space within a parking lot may comprise a base 1202a. Guidance systems (not shown) may be used to assist a vehicle operator in positioning an electric vehicle 1212 in a parking area to align an electric vehicle conductive structure 1216 within the electric vehicle 1212 with a base 1202a. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 1212 to enable an conductive structure 1216 within the electric vehicle 1212 to be adequately aligned with a charging conductive structure within a charging base (e.g., base 1202a).

As discussed above, the electric vehicle charging system 1214 may be placed on the underside of the electric vehicle 1212 for transmitting and receiving power from a base 1202a. For example, an electric vehicle conductive structure 1216 may be integrated into the vehicles underbody preferably near a center position providing maximum safety distance in regards to EM exposure and permitting forward and reverse parking of the electric vehicle.

Figure 13:
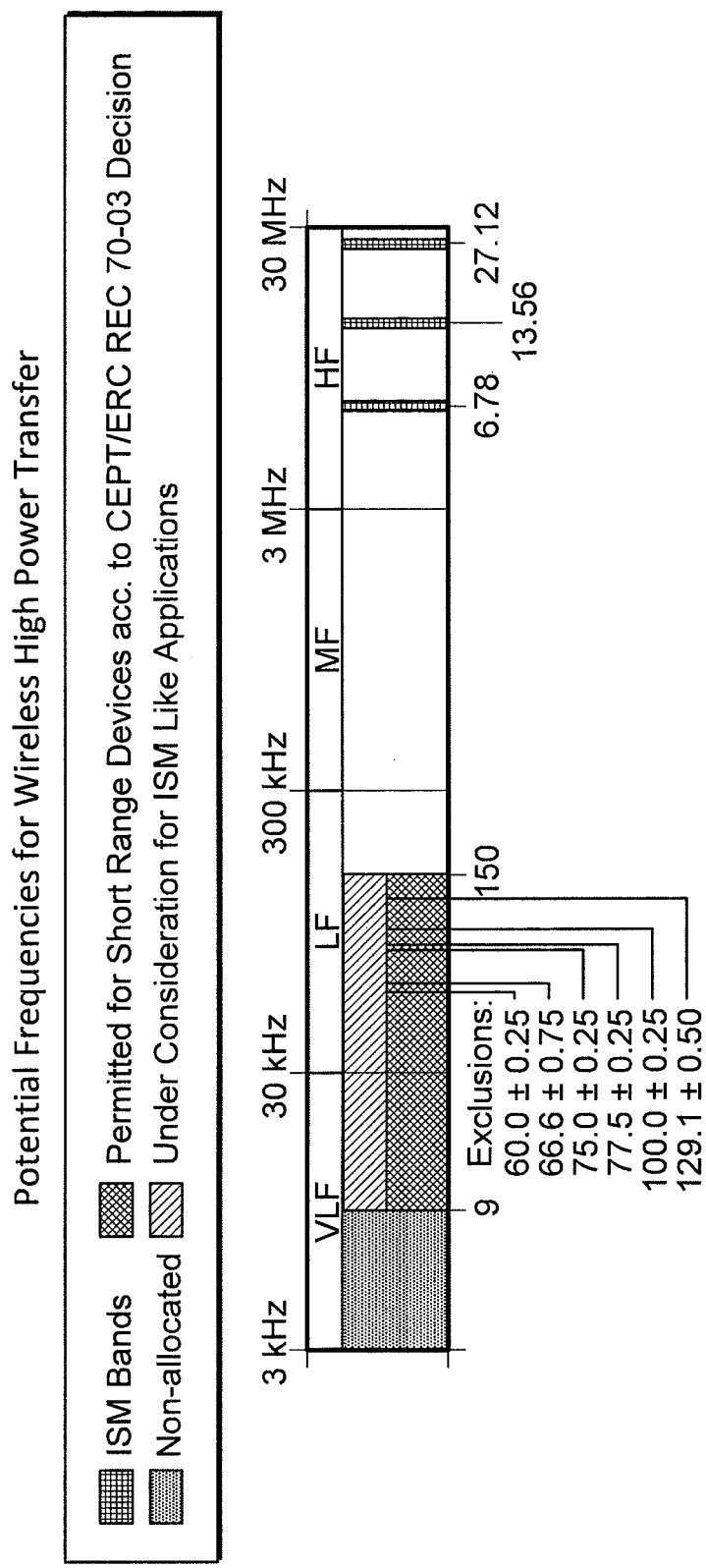
FIG. 13 is a chart of a frequency spectrum showing exemplary frequencies that may be available for wireless charging an electric vehicle.
Figure 14:
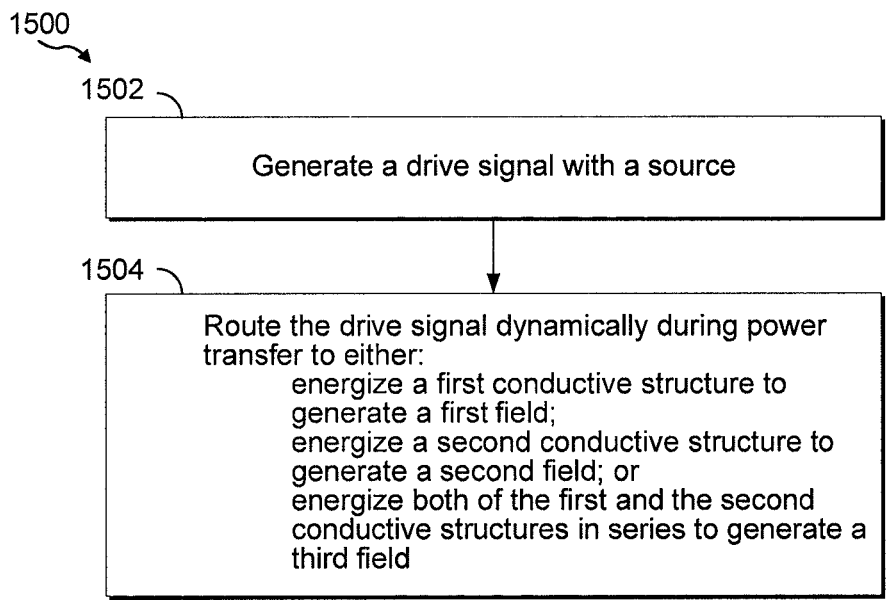
FIG. 14 is a flowchart of an exemplary method of wirelessly transmitting power.

FIG. 13 is a chart of a frequency spectrum showing exemplary frequencies that may be used for wireless charging an electric vehicle in a wireless power transfer system. As shown in FIG. 13, potential frequency ranges for wireless high power transfer to electric vehicles may include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 15:
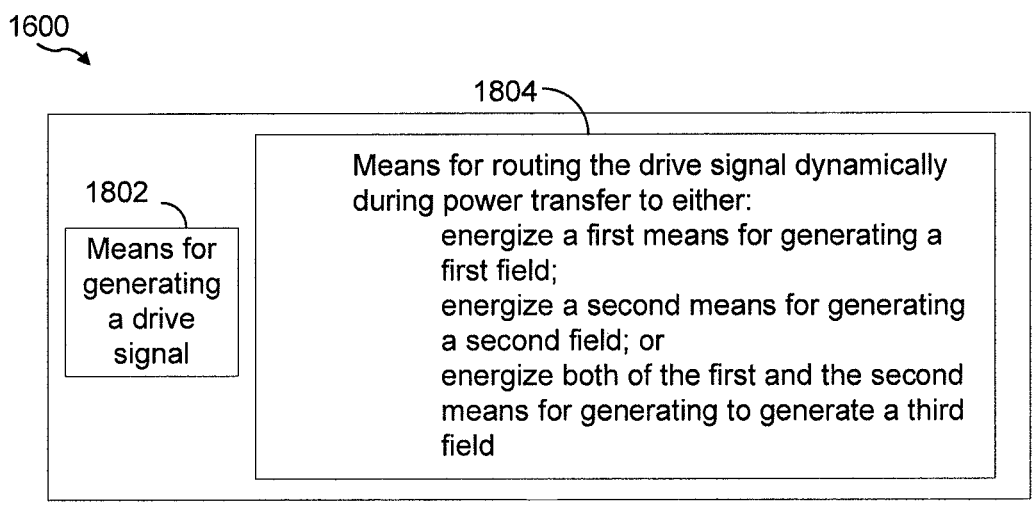
FIG. 15 is a functional block diagram of an exemplary wireless power transmitter.

FIG. 15 is a flowchart of an exemplary method 1500 of wirelessly transmitting power. The method 1500 may be used in conjunction with any of the systems described with reference to FIGS. 5A-5D, 8A-8D, and 12. At block 1502, a source generates a drive signal. At block 1504, the drive signal is selectively routed dynamically during power transfer to either energize a first conductive structure to generate a first field; energize a second conductive structure to generate a second field; or energize both of the first and the second conductive structures in series to generate a third field. By selectively energizing either one or both of the conductive structures, the generated magnetic field may be "shaped" to improve coupling efficiency with the secondary coil of the wireless power receiver or to maximize the amount of power received by the wireless power receiver.

FIG. 16 is a functional block diagram of an exemplary wireless power transmitter. Wireless power transmitter comprises means for generating a drive signal 1802 and means for routing the drive signal dynamically during power transfer 1804 to either: energize a first means for generating a first field; energize a second means for generating a second field; or energize both of the first and the second means for generating to generate a third field. Means for generating a drive signal may comprise sources 401, 501, 601, or 1230. Referring to FIG. 2, these sources are representative of circuitry prior to the LCL resonant circuit, for example utility grid power 202, line filter 211, rectifier 212, power factor correction circuit 213, energy storage element 214, and inverter circuit 215 of FIG. 2, or some subset thereof. Means for routing the drive signal dynamically during power transfer 1804 may comprise an LCL resonant circuit in either a shunt- or series-switch topology as described above and as depicted in the simplified circuits of FIGS. 5A-5D and 8A-8D. This may include including conductive structures 512, 516, 812, 816, 1204a, 1206a, 1204b, 1206b, capacitors 504, 804, 510, 514, 810, 814, transformers 508, 808, inductors 506, 806, and switches 518, 520, 522, 818, 820, 822.

The descriptions of the various electrical characteristics above (e.g., inductance, reactance) assume ideal components (e.g., inductors, capacitors, transformers). Of course, no practical implementation will include ideal components. While an ideal configuration may match the reactance of the components used in the LCL resonant circuit, including those in the transmit circuit, actual electrical component characteristic values may vary by 5%, 10%, 15%, 20%, or 25%.

It may be desirable to have a high Q (quality) factor of the transmit circuits disclosed herein, the Q factor being the center frequency of the circuit divided by the −3 dB bandwidth of the circuit. Preferably the Q factor of the transmit circuit may be 100, 200, 300, 400, 500, or 1000. A higher Q factor reduces power losses in the resonant circuit and minimizes the interaction of the transmit antenna with other structures.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power transmitter comprising:
a first conductive structure configured to generate a first field;
a second conductive structure in series with the first conductive structure and configured to generate a second field;
a source configured to generate a drive signal; and
a circuit configured to selectively route the drive signal to either one of the first or the second conductive structures or to both of the first and the second conductive structures, and further configured to maintain a tuning of the one or both of the first and second conductive structures driven by the drive signal, wherein the circuit comprises a plurality of tuning elements and a plurality of switches, wherein a switch of the plurality of switches is configured to switch a tuning element of the plurality of tuning elements between a first state and a second state different from the first state, wherein in the first state, the tuning element is in parallel with the first conductive structure.

2. The transmitter of claim 1, wherein routing the drive signal to both of the first and the second conductive structures generates a third field.

3. The transmitter of claim 1, wherein in the second state, the tuning element is bypassed.

4. The transmitter of claim 1, wherein the circuit comprises an LCL tuning network.

5. The transmitter of claim 1, further comprising a controller coupled to the circuit and configured to adjust the routing of the drive signal dynamically during power transfer.

6. The transmitter of claim 1, wherein in the second state, the tuning element is connected in series with the second conductive structure.

7. The transmitter of claim 6, wherein the tuning element of the plurality of tuning elements and the second conductive structure are further in series with a secondary coil of a transformer.

8. The transmitter of claim 6, wherein the circuit comprises an LCL tuning network, and wherein the tuning element of the plurality of tuning elements and the second conductive structure are further in series with an inductive reactance of the input branch of the LCL tuning network.

9. The transmitter of claim 6, wherein the tuning element is a capacitor that acts to tune the transmitter to an operating frequency in the first state and to correct the power factor of the transmitter in the second state.

10. The transmitter of claim 9, wherein the capacitor and the first conductive structure form a transmit circuit having a center frequency at the operating frequency and a quality factor of at least 100.

11. The transmitter of claim 1, wherein the plurality of tuning elements are configurable into at least a first configuration, a second configuration, and a third configuration based upon a switch state of each switch of the plurality of switches.

12. The transmitter of claim 11, wherein in the first configuration the drive signal energizes the first conductive structure, wherein in the second configuration the drive signal energizes the second conductive structure, and wherein in the third configuration the drive signal energizes both of the first and the second conductive structures.

13. The transmitter of claim 12, wherein the first conductive structure is tuned to an operating frequency in the first configuration, wherein the second conductive structure is tuned to the operating frequency in the second configuration, and wherein both of the first and the second conductive structures are tuned to the operating frequency in the third configuration.

14. The transmitter of claim 12, further comprising a fourth configuration wherein the drive signal bypasses both of the first and the second conductive structures.

15. The transmitter of claim 12, wherein the source provides a current to at least one of the first or second conductive structures that is substantially the same in the first configuration, the second configuration, and the third configuration.

16. The transmitter of claim 15, wherein a first amount of current flows through the first conductive structure in the first configuration and through the second conductive structure in the second configuration, the first amount of current being twice a second amount of current flowing through both of the first and second conductive structures in the third configuration.

17. A method of wirelessly transmitting power comprising:
generating a drive signal with a source; and
using a circuit comprising a plurality of tuning elements and a plurality of switches to route the drive signal dynamically during power transfer to either:
energize a first conductive structure to generate a first field, wherein a switch of the plurality of switches places a tuning element of the plurality of tuning elements in a first state in which the tuning element is in parallel with the first conductive structure;
energize a second conductive structure to generate a second field, wherein the switch of the plurality of switches places the tuning element of the plurality of tuning elements in a second state different from the first state; or
energize the first and the second conductive structures in series to generate a third field.

18. The method of wirelessly transmitting power of claim 17, wherein the second state comprises bypassing the tuning element.

19. The method of wirelessly transmitting power of claim 17, further comprising routing the drive signal to bypass both of the first and the second conductive structures.

20. The method of wirelessly transmitting power of claim 17, wherein the second state comprises switching the tuning element of a circuit to be in series with the first conductive structure.

21. The method of wirelessly transmitting power of claim 20, further comprising:
tuning the wireless power transmitter to an operating frequency with the tuning element in the first state having the tuning element in parallel with the first conductive structure; and
correcting the power factor of the wireless power transmitter with the tuning element in the second state having the tuning element in series with the second conductive structure.

22. The method of wirelessly transmitting power of claim 17, wherein a current flowing through the energized conductive structure is substantially the same when energizing either the first conductive structure, the second conductive structure, or both of the first and second conductive structures.

23. The method of wirelessly transmitting power of claim 22, wherein energizing the first and the second conductive structures in series to generate the third field comprises providing a first current flowing through both of the first and second conductive structures, wherein the first current is half of a second current provided through either the first conductive structure when energizing the first conductive structure to generate the first field or the second conductive structure when energizing the second conductive structure to generate the second field.

24. A wireless power transmitter comprising:
means for generating a drive signal; and
means for routing the drive signal dynamically during power transfer to either:
  energize a first means for generating a first field, wherein a tuning element is in a first state in which the tuning element is in parallel with the first generating means;
  energize a second means for generating a second field, wherein the tuning element is in a second state different from the first state; or
  energize both of the first and the second means for generating to generate a third field, wherein the selectively routing means maintains a tuning of one or both of the first generating means and the second generating means.

* * * * *